(12) United States Patent
Shin et al.

(10) Patent No.: US 8,703,253 B2
(45) Date of Patent: *Apr. 22, 2014

(54) COMPOSITION FOR LIQUID CRYSTAL ALIGNMENT LAYER, PREPARATION METHOD OF LIQUID CRYSTAL ALIGNMENT LAYER USING THE SAME, AND OPTICAL FILM COMPRISING THE LIQUID CRYSTAL ALIGNMENT LAYER

(75) Inventors: Du-Hyun Shin, Seoul (KR); Hyuk Yoon, Gyeonggi-do (KR); Moon-Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 751 days.

This patent is subject to a terminal disclaimer.

(21) Appl. No.: 12/863,421

(22) PCT Filed: Jan. 19, 2009

(86) PCT No.: PCT/KR2009/000272
§ 371 (c)(1),
(2), (4) Date: Jul. 16, 2010

(87) PCT Pub. No.: WO2009/091225
PCT Pub. Date: Jul. 23, 2009

(65) Prior Publication Data
US 2011/0043731 A1   Feb. 24, 2011

(30) Foreign Application Priority Data
Jan. 18, 2008 (KR) .................. 10-2008-0005839

(51) Int. Cl.
*C09K 19/00* (2006.01)
(52) U.S. Cl.
USPC ............. 428/1.2; 428/1.1; 439/123; 439/117; 430/20

(58) Field of Classification Search
USPC ............ 428/1.1, 1.2, 1.25, 1.26; 349/96, 117, 349/123; 430/20; 252/299.01
See application file for complete search history.

(56) References Cited

U.S. PATENT DOCUMENTS

| 5,976,640 A | 11/1999 | Yu et al. |
| 2003/0137633 A1 | 7/2003 | Ito et al. |
| 2006/0160970 A1 * | 7/2006 | Kim et al. ..................... 526/171 |

FOREIGN PATENT DOCUMENTS

| JP | 2001-281446 | 10/2001 |
| JP | 2002-069180 | 3/2002 |
| JP | 2004206100 A * | 7/2004 |

(Continued)

OTHER PUBLICATIONS

Machine English translation of JP 2004-206100A, Dec. 2012.*

*Primary Examiner* — Gwendolyn Blackwell
*Assistant Examiner* — Ruiyun Zhang
(74) *Attorney, Agent, or Firm* — McKenna Long & Aldridge, LLP (57) ABSTRACT

The present invention relates to a composition for liquid crystal alignment layer, a preparation method of liquid crystal alignment layer using the same, and an optical film comprising the liquid crystal alignment layer. More particularly, the composition for liquid crystal alignment layer according to the present invention includes crosslinkable functional monomers as well as a photoreactive polymer, thereby improving thermal stability and durability of the liquid crystal alignment layer that is prepared by using the composition for liquid crystal alignment layer. In addition, when the liquid crystal alignment layer is used to produce an optical film, adhesive strength between substrate and liquid crystal alignment layer and between liquid crystal alignment layer and liquid crystal film can be improved.

8 Claims, 3 Drawing Sheets

(56) References Cited

FOREIGN PATENT DOCUMENTS

| KR | 1998-057660 A | 9/1998 |
| KR | 10-2004-0035437 A | 4/2004 |
| KR | 10-2006-0080552 A | 7/2006 |
| WO | WO 2006/073270 A1 | 7/2006 |
| WO | WO 2007/064160 | 6/2007 |

* cited by examiner

COMPOSITION FOR LIQUID CRYSTAL ALIGNMENT LAYER, PREPARATION METHOD OF LIQUID CRYSTAL ALIGNMENT LAYER USING THE SAME, AND OPTICAL FILM COMPRISING THE LIQUID CRYSTAL ALIGNMENT LAYER

TECHNICAL FIELD

The present invention relates to a composition for liquid crystal alignment layer, a preparation method of liquid crystal alignment layer using the same, and an optical film comprising the liquid crystal alignment layer.

This application is a National Stage Application of PCT/KR2009/000272, filed on Jan. 19, 2009, which claims the benefit of Korean Patent Application No. 10-2008-0005839, filed on Jan. 18, 2008, in the Korean Intellectual Property Office, both of which are incorporated herein in its entirety by reference.

BACKGROUND ART

In general, optical films, such as a retardation film and a view angle compensating film, are disposed between a polarizing plate and liquid crystal cells, so that color change of liquid crystal display (LCD) is decreased and viewing angle is expanded to improve brightness. The optical film is mainly divided into two films: one stretched film prepared by stretching a polymer film to give optical anisotropy, and the other liquid crystal film prepared by coating a plastic substrate with a polymeric liquid crystal compound and curing the polymeric liquid crystal compound by UV irradiation. In particular, liquid crystal film may be mainly divided into a rod-type liquid crystal and a disc-type liquid crystal, depending on the shape of the liquid crystal molecules. Among them, the rod-type liquid crystal can be aligned in various shapes such as planar, homeotropic, tilted, splay, cholesteric shapes, and therefore their optical properties owing to the various shapes are also diverse and unique, compared to those of the stretched film. Thus, if the stretched film is directly coated with the polymeric liquid crystal compound to give the various liquid crystal alignment properties, the liquid crystal film may function as a protective film and an optical compensation film of the polarizer.

The liquid crystal film is generally manufactured by coating a plastic substrate with a composition for an alignment layer such as polyimide and polyvinyl alcohol to form an alignment layer, rubbing the alignment layer in a predetermined direction, and then coating the alignment layer with the polymeric liquid crystal compound. However, when such alignment layer is used, a liquid crystal film may be peeled off or shrunken from the alignment layer due to the insufficient adhesive force to the liquid crystal film under hot and humid environments. Moreover, when an alignment layer is manufactured using the rubbing process, there are several problems in that electrostatic discharge or defect sites may be caused due to contact with impurities during rubbing, and fine dust by a rubbing cloth may be generated.

To solve the above problems, liquid crystal alignment methods comprising a non-rubbing process have been developed. Among them, a photo-alignment is proposed, in which a liquid crystal alignment layer is manufactured by light irradiation. In this connection, examples of the photopolymerizible alignment material for liquid crystal alignment include those prepared by photodimerization such as cinnamate, coumarin, and chalcon, by photoisomerization of polymer having an azobenzene group, and by photodegradation of polyimide polymer. However, these materials show poor thermal stability or light stability, and contamination due to byproducts may occur.

To manufacture a retardation film, a view angle compensating film, a brightness improving film using a polymeric liquid crystal compound, an alignment layer is generally formed on a plastic substrate. However, even though using the composition for alignment layer prepared by the above process, its application is limited to the types of plastic substrate.

DISCLOSURE OF INVENTION

Technical Problem

Accordingly, in order to solve the above problems, the present invention provides a liquid crystal alignment layer that is excellent in terms of liquid crystal orientation property, thermal stability, and durability, as well as adhesive strength between a substrate and the liquid crystal alignment layer and between the liquid crystal alignment layer and a liquid crystal film, in which crosslinkable functional monomers are introduced into a photoreactive polymer, thereby generating additional crosslinking reaction even by short exposure to irradiation.

Technical Solution

In order to achieve the above objects, the present invention provides a composition for liquid crystal alignment layer, comprising 1) one or more photoreactive polymer selected from the group consisting of a norbornene-based photoreactive polymer comprising a cinnamate group, a photoreactive polymer comprising an unit represented by the following Formula 1, and a photoreactive polymer comprising an unit represented by the following Formula 2, 2) a multifunctional monomer crosslinkable with the photoreactive polymer, 3) a photoinitiator, and 4) an organic solvent.

[Formula 1]

[Formula 2]

Further, the present invention provides a preparation method of liquid crystal alignment layer, comprising the steps of:

1) applying and drying the composition for liquid crystal alignment layer on a substrate to form a coating, and
2) irradiating UV rays onto the coating formed on the substrate.

Further, the present invention provides an optical film, comprising the liquid crystal alignment layer that is prepared according to the preparation method of liquid crystal alignment layer.

Furthermore, the present invention provides a liquid crystal display device comprising the optical film.

Advantageous Effects

A liquid crystal alignment layer that is prepared using the composition for liquid crystal alignment layer according to the present invention is excellent in terms of thermal stability and surface hardness, as well as adhesive strength between a substrate and the liquid crystal alignment layer and between the liquid crystal alignment layer and a liquid crystal film, thereby improving durability of optical film. In addition, under the conditions of high temperature and high humidity, the liquid crystal film is not shrunken, or not separated from the liquid crystal alignment layer.

BEST MODE FOR CARRYING OUT THE INVENTION

Hereinafter, the present invention will be described in detail.

The composition for liquid crystal alignment layer according to the present invention is characterized in that it comprises 1) one or more photoreactive polymer selected from the group consisting of a norbornene-based photoreactive polymer comprising a cinnamate group, a photoreactive polymer comprising an unit represented by the Formula 1, and a photoreactive polymer comprising an unit represented by the Formula 2, 2) a multifunctional monomer crosslinkable with the 1) photoreactive polymer, 3) a photoinitiator, and 4) an organic solvent.

In the composition for liquid crystal alignment layer according to the present invention, it is preferable that the 1) photoreactive polymer has a number average molecular weight of 10,000 to 500,000.

The norbornene-based photoreactive polymer comprising a cinnamate group may comprise a unit represented by the following Formula 3.

[Formula 3]

wherein n is 50 to 5,000,
at least one of R1 and R2 is represented by the following Formula 4, and
the other is selected from the group consisting of a hydrogen, a halogen, an alkyl group having 1 to 20 carbon atoms, and a group represented by the following Formula 4,

[Formula 4]

wherein R3 is each independently selected from the group consisting of a hydrogen, a halogen, an alkyl group having 1 to 20 carbon atoms, an alkoxy group having 1 to 20 carbon atoms, and an allyloxy group.

Examples of the photoreactive polymer comprising a cinnamate group may include any one or more selected from the group consisting of polynorbornene cinnamate, polynorbornene alkoxycinnamate (alkoxy group having 1 to 20 carbon atoms), polynorbornene allyloyloxycinnamate, polynorbornene fluorinatedcinnamate, polynorbornene chlorinatedcinnamate, and polynorbornene dicinnamate, but are not limited thereto.

In the composition for liquid crystal alignment layer according to the present invention, the photoreactive polymer comprising a cinnamate group is more preferably any one or more of compounds represented by the following Formulae 5 to 10.

wherein n is 50 to 5,000.

The content of the photoreactive polymer is preferably 0.1 to 20% by weight, and more preferably 0.1~10% by weight, based on the total composition for liquid crystal alignment layer. If the content is less than 0.1% by weight, the coating thickness is too thin to obtain a good alignment layer. If the content is more than 20% by weight, the coating thickness is too thick to obtain a good alignment layer.

In the composition for liquid crystal alignment layer according to the present invention, the 2) multifunctional monomer is used together with the 1) photoreactive polymer to induce a crosslinking reaction upon UV irradiation, in addition to dimerization of the photoreactive polymer.

The crosslinking reaction includes a crosslinking reaction in the photoreactive polymer, a crosslinking reaction between the photoreactive polymer and multi-functional monomer, and a crosslinking reaction between the photoreactive polymer and liquid crystal molecule.

When the cinnamate group is irradiated by polarized UV, it aligns perpendicular to the polarization direction of irradiated UV. However, a part of the total cinnamate group is only reacted, and the unreacted group still remains. In the present invention, the unreacted cinnamate groups are utilized to improve adhesive strength between the substrate and the liquid crystal alignment layer and between the liquid crystal alignment layer and the liquid crystal film. That is, when the photoinitiator and the multifunctional monomer are added, a crosslinking reaction is induced between the unreacted cinnamate groups or between the cinnamate group and the multifunctional monomer, thereby inducing a crosslinking reaction with liquid crystal molecules applied on the liquid crystal alignment layer.

Herein, the term "multifunctional" is understood as having 2 or more functional groups.

The functional group functions to generate crosslinking reaction and polymerization reaction by radicals, and any functional group may be used without limitation, as long as it contains a carbon-carbon double bond. For example, representative example thereof may include an acrylate group, but is not limited thereto.

It is preferable that the multifunctional monomer contains a functional group (carbon-carbon double bond) that generates a radical reaction selected from the group consisting of the following Structural Formulae.

Specific examples of the multifunctional monomer may include one or two or more selected from trimethylolpropane triacrylate, pentaerythritol tri(meth)/tetraacrylate, dipentaerythritol hexa/pentaacrylate, triglycerol di(meth)acrylate, tripropylene glycol di(meth)acrylate, tetraethylene glycol di(meth)acrylate, pentaerythritol di(meth)acrylate, 1,6-hexandiol di(meth)acrylate, glycerol di(meth)acrylate, 2-hydroxyethyl(meth)acrylate, 2-hydroxypropyl(meth)acrylate, methoxyethyl(meth)acrylate, N,N-dimethylaminoethyl(methyl)acrylate, butoxytriethylene glycol(meth)acrylate, 2-carboxyethyl acrylate, hydroxypropyl acrylate, mono-2-(acryloyloxy)ethyl succinate, vinyl acrylate, 3-(acryloyloxy)-2-hydroxypropyl(meth)acrylate, glycerol 1,3-diglycerolate diacrylate, tri(propylene glycol)glycerolate diacrylate, allyl (meth)acrylate, diacetone acrylamide, (meth)acrylamide, methyl 2-acetamidoacrylate, N-[tris(hydroxymethyl)methyl] acrylamide, N,N'-(1,2-dihydroxyethylene)bisacrylamide, N,N'-methylenebis(acrylamide), 1,3,5-triacryloylhexahydro-1,3,5-triazine, 2,4,6-triallyloxy-1,3,5-triazine, tris(2,3-epoxypropyl)isocyanurate, tris[2-(acryloyloxy)ethyl]isocyanurate, tetracyanoethylene oxide, triallyl 1,3,5-benzenetricarboxylate, diacetone acrylamide, N,N'-(1,2-dihydroxyethylene)bisacrylamide, poly(melamine-co-formaldehyde), 2-carboxyethyl acrylate, hydroxypropyl acrylate, mono-2-(acryloyloxy)ethyl succinate, vinyl acrylate, 3-(acryloyloxy)-2-hydroxypropyl(meth)acrylate, 2-(2-oxo-imidazolydinyl)ethyl(meth)acrylate, caprolactone 2-((meth)acryloyloxy)ethyl ester, mono-2-((meth)acryloyloxy)ethyl malate, 1,2,3-triazol-4,5-dicarboxylic acid, 3-allyloxy-1,2-propandiol, bis[4-(glycidyloxy)phenyl]methane, 2-vinyl-1,3-dioxalene, but are not limited thereto.

In particular, the multifunctional monomer is preferably pentaerythritol triacrylate, dipentaerythritol hexaacrylate, or tris[2-(acryloyloxy)ethyl]isocyanurate, but is not limited thereto.

The content of the multifunctional monomer is preferably 0.1 to 20% by weight, and more preferably 0.1 to 5% by weight, based on the total composition for liquid crystal alignment layer. If the content is less than 0.1% by weight, the additional crosslinking reaction does not occur. If the content is more than 20% by weight, alignment effect cannot be attained.

In the composition for liquid crystal alignment layer according to the present invention, any photoinitiator may be employed, as long as it can induce radical reaction. Specifically, examples of the photoinitiator may include α-hydroxy ketone-based, α-amino ketone-based, phenyl glyoxylate-based, and oxime ester-based photoinitiators, but are not limited thereto.

The content of the photoinitiator is preferably 0.01 to 5% by weight, and more preferably 0.01 to 2% by weight, based on the total composition for liquid crystal alignment layer. If the content is less than 0.01% by weight, the additional crosslinking reaction does not occur. If the content is more than 5% by weight, alignment effect is significantly reduced.

In the composition for liquid crystal alignment layer according to the present invention, examples of the 4) organic solvent may include one or more organic solvents selected from the group consisting of ether-based, aromatic-based, halogen-based, olefin-based, and ketone-based organic solvents, more specifically, cyclopentanone, chlorobenzene, N-methylpyrrolidone, toluene, dimethylsulfoxide, dimethylformamide, chloroform, gammabutyrolactone, or tetrahydrofuran, but are not limited thereto.

Further, the preparation method of liquid crystal alignment layer according to the present invention comprises the steps of 1) applying and drying the composition for liquid crystal alignment layer according to the present invention on a substrate to form a coating, and 2) irradiating UV rays onto the coating formed on the substrate.

In the preparation method of liquid crystal alignment layer according to the present invention, the substrate of step 1) is not particularly limited, but may be a glass or plastic substrate. More preferably, acetylcellulose-based films, cycloolefin-based films, or acrylic films may be used.

The acetylcellulose-based films are, but not specifically limited to, acetylcellulose-based films that are generally used in the art. Example thereof may include a triacetyl-cellulose (TAC) film, but is not limited thereto.

The cycloolefin-based films are, but not specifically limited to, films prepared from cycloolefin-based resins that are generally used in the art, for example, films prepared from cycloolefin-based resins including a hydrogenated cycloolefin ring-open polymer, a cycloolefin addition polymer, a copolymer of cycloolefin and α-olefin, and a graft denatured product obtained by denaturing the above polymers or copolymers with unsaturated carboxylic acid or a derivative thereof. The cycloolefin-based film may be an unstretched or stretched film.

The acrylic film may comprise a (meth)acrylic resin.

The (meth)acrylic resin may use (meth)acrylic resin that is generally known in the art. In particular, a homo or copolymer of (meth)acrylic monomer; a copolymer of (meth)acrylic monomer and aromatic vinyl monomer; a copolymer of (meth)acrylic monomer, aromatic vinyl monomer, and acid anhydride monomer; and a copolymer of (meth)acrylic monomer and cyclic-based monomer may be used.

The (meth)acrylic monomer, any compound may be used, as long as it has double bonds between the carbonyl group of ester group and conjugated carbon atoms, and its substituent is not particularly limited. As used herein, the (meth)acrylic monomer encompasses acrylate as well as acrylic derivatives, including alkylacrylate, alkyl methacrylate, and alkyl butacrylate. For example, the (meth)acrylic monomer includes a compound represented by the following Formula 11.

[Formula 11]

wherein $R_1$, $R_2$ and $R_3$ are each independently represent a hydrogen atom or a monovalent hydrocarbon group having 1 to 30 carbon atoms, which may contain a hetero atom; and R4 represents a hydrogen atom or an alkyl group having 1 to 6 carbon atoms.

Specific examples of the (meth)acrylic monomer may include one or more selected from the group consisting of methylacrylate, ethylacrylate, methylmethacrylate, ethylmethacrylate, methylethacrylate, and ethylethacrylate. In particular, it is most preferable that the methylmethacrylate (MMA) is used.

The aromatic vinyl monomer may include a monomer unsubstituted or substituted with one or more C1 to C5 alkyl group or halogen group at benzene ring or vinyl group. For example, one or more styrene-based monomer selected from the group consisting of styrene, α-methylstyrene, p-methylstyrene, and vinyl toluene may be preferably used.

As the acid anhydride monomer, carboxylic acid anhydride may be used, and polyvalent carboxylic acid anhydride such as monovalent or divalent carboxylic acid anhydride may be used. It is preferable to use maleic anhydride or derivatives thereof, for example, a compound represented by the following Formula 12.

[Formula 12]

wherein $R_7$ and $R_8$ each independently represent a hydrogen atom or an alkyl group having 1 to 6 carbon atoms.

Examples of the cyclic-based monomer may include a maleic anhydride acid, a maleimide, a glutaric acid anhydride, a glutalimide, a lactone, a lactam, and the derivatives thereof. The cyclic monomer is preferably maleimide-based monomer. Examples of the maleimide-based monomer may include N-cyclohexylmaleimide, N-phenylmaleimide, N-methylmaleimide, N-butylmaleimide or the derivatives thereof, but it is not limited thereto, and in particular, it is most preferable to use N-cyclohexylmaleimide or the derivatives thereof. The content of the cyclic-based monomer in the copolymer of (meth)acrylic monomer and cyclic-based monomer is preferably 1 to 50% by weight to reduce a haze value of the film.

The film comprising (meth)acrylic resin may further comprise at least one selected from an aromatic-based resin having both an aromatic moiety and a chain having a hydroxyl-containing moiety; a styrene-based resin; and a copolymer of styrene-based monomer and cyclic monomer.

It is preferable that the number average molecular weight of the aromatic-based resin having both an aromatic moiety and a chain having a hydroxyl-containing moiety is in the range of 1,500 to 2,000,000. It is preferable that the aromatic-based resin comprises a phenoxy-based resin. The phenoxy-based resin comprises the structure of benzene ring bonded at least one oxygen radical. For example, the aromatic-based resin having both an aromatic moiety and a chain having a hydroxyl-containing moiety may comprise one or more unit represented by the following Formula 13. It is preferable that the aromatic-based resin comprises 5 to 10,000, preferably 5 to 7,000, more preferably 5 to 5,000 units of Formula 13. In case of when the aromatic-based resin comprises two or more units represented the following Formula 13, they may be included in the type of random, alternate, or block.

[Formula 13]

wherein X is a divalent group comprising at least one benzene ring, and R is a straight-chain or branched-chain alkylene having 1 to 6 carbon atoms.

Specially, X is preferably a divalent group derived from the compound of the following Formula 14 to 16, but it is not limited thereto.

[Formula 14]

wherein $R^1$ is a direct bond, a straight-chain or branched-chain alkylene having 1 to 6 carbon atoms, or a cycloalkylidene having 3 to 20 carbon atoms, and

$R^2$ and $R^3$ are each independently a hydrogen, a straight-chain or branched-chain alkyl having 1 to 6 carbon atoms, or a straight-chain or branched-chain alkenyl having 2 to 6 carbon atoms, and n and m are each independently an integer in the range of 1 to 5.

[Formula 15]

wherein $R^4$ is each independently a hydrogen, a straight-chain or branched-chain alkyl having 1 to 6 carbon atoms, or a straight-chain or branched-chain alkenyl having 2 to 6 carbon atoms, and p is an integer in the range of 1 to 6.

[Formula 16]

$R^6$ and $R_7$ are each independently a direct bond, a straight-chain or branched-chain alkylene having 1 to 6 carbon atoms, or a cycloalkylidene having 3 to 20 carbon atoms, and

$R^5$ and $R^8$ are each independently a hydrogen, a straight-chain or branched-chain alkyl having 1 to 6 carbon atoms, or a straight-chain or branched-chain alkenyl having 2 to 6 carbon atoms, and q and r are each independently an integer in the range of 1 to 5.

Specific examples of the compound represented by the Formula 14 to 16 may include following formulae, but it is not limited thereto.

It is most preferable that the aromatic-based resin comprises one or more phenoxy-based unit represented by the following Formula 17.

[Formula 17]

The terminal of the aromatic-based resin may be an OH group.

In case of when the film comprising the (meth)acrylic resin comprises the aromatic-based resin having both an aromatic moiety and a chain having a hydroxyl-containing moiety, the content of the (meth)acrylic resin is preferably about 40 to 99% by weight, more preferably about 70 to 98% by weight and the content of the aromatic-based resin is preferably about 1 to 60% by weight, more preferably about 2 to 30% by weight.

In case of when the copolymer of a styrene-based monomer and a cyclic-based monomer is used, the content of the cyclic-based monomer in the copolymer is about 1 to 99% by weight, preferably about 1 to 70% by weight, and more preferably about 5 to 60% by weight.

In case of when the film comprising the (meth)acrylic resin comprises the styrene-based resin or the copolymer of styrene-based monomer and cyclic-based monomer with the aromatic-based resin having both an aromatic moiety and a chain having a hydroxyl-containing moiety, the content of the (meth)acrylic resin is preferably about 50 to 99% by weight, more preferably about 75 to 98% by weight, the content of the aromatic-based resin is preferably about 0.5 to 40% by weight, more preferably about 1 to 30% by weight, and the content of the styrene-based resin or the copolymer of a styrene-based monomer and a cyclic-based monomer is preferably about 0.5 to 30% by weight, more preferably about 1 to 20% by weight.

In step 1), any coating method may be employed, as long as it is typically performed in the art to apply the composition for liquid crystal alignment layer on a substrate, preferably a method of applying the composition on the substrate to a thickness of 800 to 2,000 Å.

In step 1), after the composition for liquid crystal alignment layer is applied on the substrate, a drying process may be performed at 25 to 150° C. for at least 30 sec to remove the residual solvent. If the drying temperature is less than 25° C., the substrate is not sufficiently dried, and thus stains may be generated or alignment performance may be reduced due to residual solvent. If the drying temperature is more than 150° C., the substrate may be deformed.

In the preparation method of liquid crystal alignment layer according to the present invention, step 2) is a step of irradiating polarized UV rays onto the coating formed by using the composition for liquid crystal alignment layer in a predetermined direction for 0.5 sec or longer to provide a desired alignment direction, in which UV-induced dimerization (ring addition) of the photoreactive polymer constituting the liquid crystal alignment layer is generated to primarily induce molecular alignment in a direction (absorption axis) perpendicular to a transmission axis of UV polarizing plate (wire-grid polarizing plate). Therefore, the alignment direction of the alignment layer can be adjusted to a desired angle by adjusting the polarization direction of the UV rays. Thus, it is possible to adjust an optical axis of the polymeric liquid crystal compound to be applied on the liquid crystal alignment layer in any direction to that of the substrate.

Further, the present invention provides an optical film comprising a polymeric liquid crystal compound and the liquid crystal alignment layer that is prepared from the preparation method of liquid crystal alignment layer according to the present invention.

The optical film according to the present invention may have an optical anisotropy, and may be used as a retardation film or a polarizing plate protective film for liquid crystal display device.

The liquid crystal alignment layer according to the present invention has an excellent adhesive strength between the substrate and the liquid crystal alignment layer. Thus, when the liquid crystal alignment layer is applied to the optical film, a liquid crystal alignment layer including a substrate, that is, a substrate-integral liquid crystal alignment layer may be used. If necessary, the substrate is separated, and the liquid crystal alignment layer may be only applied to the optical film.

The polymeric liquid crystal compound may be a nematic liquid crystal or cholesteric liquid crystal which is polymerized with the surrounding liquid crystal monomers by lights to form a liquid crystal polymer.

In general, after the polymeric liquid crystal compound is applied onto an oriented plastic substrate or an alignment layer, which is fixed by applying the alignment layer composition on the plastic substrate, in an isotropic phase, it exhibits a phase transition into nematic or cholesteric liquid crystals by polymerization during drying and curing processes, and thus the liquid crystals are aligned in a specific direction. Therefore, when other layers are laminated thereto, the alignment is not changed.

In the optical film according to the present invention, one or more substances having an acrylate group being polymerizable by photoreaction is preferably used as the polymeric liquid crystal compound. Examples of the substance having an acrylate group may include a low-molecular weight liquid crystal having a nematic or cholesteric phase at a room or high temperature, such as cyanobiphenyl-based acrylate, cyanophenyl cyclohexane-based acrylate, cyanophenyl ester-based acrylate, phenyl ester benzoate-based acrylate, phenylpyrimidine acrylate and a mixture thereof.

The optical film according to the present invention may be prepared by applying the liquid crystal compound solution to the liquid crystal alignment layer that is oriented to a desired angle by polarized UV irradiation, drying it, and then UV irradiation.

Further, the present invention provides a preparation method of the optical film, comprising the steps of: 1) applying and drying a liquid crystal compound solution comprising a polymeric liquid crystal compound, a photoinitiator, and an organic solvent on a liquid crystal alignment layer that is formed by using a composition for liquid crystal alignment layer according to the present invention, and an organic solvent, so as to form a liquid crystal layer, and 2) irradiating UV rays on the formed liquid crystal layer to form a liquid crystal film.

The liquid crystal compound solution may be prepared by dissolving the polymeric liquid crystal compound and the photoinitiator in an organic solvent. In the liquid crystal compound solution, the content of the polymeric liquid crystal compound is, but not specifically limited to, preferably 5 to 70 parts by weight, and more preferably 5 to 50 parts by weight, based on 100 parts by weight of the total liquid crystal compound solution. If the content of the polymeric liquid crystal compound is less than 5 parts by weight, stains may be generated. If the content of the polymeric liquid crystal compound is more than 70 parts by weight, the polymeric liquid crystal compound may be precipitated due to the low content of the solvent.

In the liquid crystal compound solution, the photoinitiator is contained in a small amount. In the total liquid crystal compound solution, the content of the photoinitiator is preferably 3 to 10 parts by weight, based on 100 parts by weight of the polymeric liquid crystal compound. If the content of the photoinitiator is less than 3 parts by weight, it is difficult to achieve a sufficient cure upon UV irradiation. If the content of the photoinitiator is more than 10 parts by weight, the photoinitiator may generate change in the orientation of liquid crystals.

The liquid crystal compound solution may contain a chiral agent, a surfactant, a polymeric monomer, or a polymer which does not interfere with the orientation of liquid crystals, in addition to the photoinitiator.

Examples of the organic solvent to be used for the preparation of liquid crystal compound solution may include halogenated hydrocarbons such as chloroform, tetrachloroethane, trichloroethylene, tetrachloroethylene, and chlorobenzene; aromatic hydrocarbons such as benzene, toluene, xylene, methoxy benzene, and 1,2-dimethoxybenzene; ketones such as acetone, methyl ethyl ketone, cyclohexanone, and cyclopentanone; alcohols such as isopropyl alcohol and n-butanol; and cellosolves such as methyl cellosolve, ethyl cellosolve, and butyl cellosolve, but are not limited thereto. They may be used alone or in a mixture.

After applying the liquid crystal compound solution on the alignment layer, a drying process is preferably performed at 25 to 120° C. for at least 1 min. The drying temperature plays an important role in the determination of liquid crystal orientation. If the drying process is not performed within the above range, the liquid crystal orientation may be affected, and stains may be generated.

After the drying process, the liquid crystal layer that is aligned on the alignment layer is polymerized and cured by UV irradiation, and thus fixed. At this time, the curing process by polymerization is performed in the presence of a photoinitiator that absorbs light in the UV region. The UV irradiation may be performed in an atmospheric environment or in an oxygen-free nitrogen environment to improve the reaction efficiency. Typically, the UV irradiation may be performed using a middle or high pressure mercury UV lamp or a metal halide lamp having an intensity of 80 w/cm or higher. Upon UV irradiation, a cold minor or other cooling apparatuses may be installed between the substrate and the UV lamp so that a surface temperature of a liquid crystal layer can be within the liquid crystalline temperature upon UV irradiation.

Further, the present invention provides a liquid crystal display device comprising one or more of the optical film.

The optical film according to the present invention may used as an optical compensation member for liquid crystal displays. Examples thereof may include a retardation film such as a STN (Super Twist Nematic) type LCD, a TFT-TN (Thin Film Transistor-Twisted Nematic) type LCD, a VA (Vertical Alignment) type LCD, and an IPS (In-Plane Switching) type LCD; a ½ wavelength plate; a ¼ wavelength plate; an inverse wavelength dispersion property film; an optical compensation film; a color filter; a laminate film including a polarizing plate; and a polarizing plate compensation film.

The liquid crystal display device comprising one or more optical films will be described in detail as follows.

In the liquid crystal display which includes a liquid crystal cell, a first polarizing plate and a second polarizing plate, respectively, provided on both sides of the liquid crystal cell, the optical film may be provided between the liquid crystal cell and the first polarizing plate and/or the second polarizing plate. That is, optical anisotropy film may be provided between the first polarizing plate and the liquid crystal cell, and one or more optical films may be provided between the second polarizing plate and the liquid crystal cell, or between the first polarizing plate and the liquid crystal cell and between the second polarizing plate and the liquid crystal cell.

The first polarizing plate and the second polarizing plate may include a protective film on a side or both sides thereof. Examples of the inner protective film may include, but are not limited to, a triacetate cellulose (TAC) film, a polynorbornene film which is produced by using ring opening metathesis polymerization (ROMP), a HROMP (ring opening metathesis polymerization followed by hydrogenation) polymer which is produced by using hydrogenation of a ring-opened cyclic olefin polymer, a polyester film, and a polynorbornene film which is produced by using addition polymerization. Additionally, a protective film which is made of a transparent polymer material may be used. However, examples of the protective film are not limited thereto.

Further, the present invention provides an integrated polarizing plate comprising a polarizing film and one or more optical films according to the present invention as a protective film, provided on one side or both sides of the polarizing film.

If the optical film according to the present invention is provided as a protective film in the integrated polarizing plate, the polarizing film may be contacted with the substrate or the liquid crystal film of the optical film of the present invention.

If the optical film according to the present invention is provided on only one side of the polarizing film, a protective film which is known in the related art may be provided on another side thereof.

Examples of the polarizing film may include a film which contains iodine or dichromatic dyes and is made of polyvinyl alcohol (PVA). The polarizing film may be produced by applying iodine or dichromatic dyes on the PVA film. However, the production method of the polarizing plate is not limited. In the present specification, the polarizing film does not include the protective film, and the polarizing plate includes the polarizing film and the protective film.

In the integrated polarizing plate of the present invention, the protective film and the polarizing film may be combined with each other by using a method known in the related art.

For example, the combination of the protective film and the polarizing film may be performed according to an attachment method using an adhesive. That is, the adhesive is applied on the surface of the PVA film that is the protective film of the polarizing film or the polarizing film by using a roll coater, a gravure coater, a bar coater, a knife coater, a capillary coater, or the like. Before the adhesive is completely dried, the protective film and the polarizing film are combined with each other using heat pressing or pressing at normal temperature by means of a combination roll. When a hot melt type adhesive is used, the heat pressing roll is used.

Examples of the adhesive which is capable of being used to combine the protective film and the polarizing plate include, but are not limited to, a one- or two-liquid type PVA adhesive, a polyurethane adhesive, an epoxy adhesive, a styrene-butadiene rubber (SBR) adhesive, or a hot melt adhesive. If the polyurethane adhesive is used, it is preferable to use the polyurethane adhesive produced by using an aliphatic isocyanate compound which does not cause yellowing due to light. If an one- or two-liquid type dry laminate adhesive or an adhesive having relatively low reactivity in respects to isocyanate and a hydroxy group is used, a solution type adhesive which is diluted with an acetate solvent, a ketone solvent, an ether solvent, or an aromatic solvent may be used. In this connection, it is preferable that the adhesive have low viscosity of 5,000 cps or less. Preferably, the adhesive has excellent storage stability and light transmittance of 90% or more at a wavelength of 400 to 800 nm.

Any adhesive may be used as long as the adhesive has desirable adhesion strength. It is preferable that the adhesive is sufficiently cured by heat or ultraviolet rays after the combination so that mechanical strength required in the adhesive is ensured, and interfacial adhesion strength is large so that stripping does not occur as long as any one of both sides of the film to which the adhesive is attached is not destroyed.

Specific examples of the adhesive may include natural rubber, synthetic rubber, or elastomer having excellent optical transparency, a vinyl chloride/vinyl acetate copolymer, polyvinyl alkyl ether, polyacrylate, denatured polyolefin adhesive, and a curable adhesive containing a curing agent such as isocyanate.

Further, the present invention provides a liquid crystal display device comprising the integrated polarizing plate.

If the liquid crystal display device according to the present invention is included in the above described integrated polarizing plate, one or more of the optical film according to the present invention may be additionally provided between the polarizing plate and the liquid crystal cell.
Mode for the Invention Hereinafter, the preferred Examples are provided for better understanding. However, these Examples are for illustrative purposes only, and the invention is not intended to be limited by these Examples.

EXAMPLE

Example 1

As listed in the following Table 1, 5-norbornene-2-methyl-(4-methoxy cinnamate) as a photoreactive polymer, pentaerythritol triacrylate as a multifunctional monomer, and Irgacure 907 (Swiss, Ciba-Geigy) as a photoinitiator were dissolved in cyclopentanone at a concentration of 2% by weight, 2% by weight, and 0.5% by weight, respectively. The composition solution for liquid crystal alignment layer that were prepared according to the above composition was applied on a cycloolefine-based film (Japan, SEKISUI, KANEKA) to a dry thickness of 1,000 Å, and dried with hot wind for 2 minutes in a 70° C. dry oven to form a liquid crystal alignment layer.

The liquid crystal alignment layer was cured once by polarized UV perpendicular to substrate direction at a rate of 3 m/min using an 80 w/cm high-pressure mercury lamp and a wire-grid polarizing plate (Moxtek) to provide alignment property.

The mixed solid of 95% by weight of the polymeric liquid crystal compound (Merck) having a splay alignment, which consists of cianobiphenyl-based acrylate, cianophenyl cyclohexane-based acrylate, and cianophenyl ester-based acrylate, and 5% by weight of Irgacure 907 (Swiss, Ciba-Geigy) as a photoinitiator was dissolved in toluene at a solid concentration of 25 parts by weight, based on solution 100 parts by weight of the total solution to prepare a polymeric liquid crystal compound solution. The polymeric liquid crystal compound solution was applied on the liquid crystal alignment layer to a dry thickness of 1 micron, and dried with hot wind for 2 minutes in a 60° C. dry oven, and cured by non-polarized UV irradiation using an 80 w/cm high-pressure mercury lamp to produce a liquid crystal film.

As a result, it is possible to finally prepare an optical film laminate including a cycloolefine-based film, a liquid crystal alignment layer formed on the cycloolefine-based film, and a liquid crystal film formed on the liquid crystal alignment layer, all of which are laminated in sequence.

Adhesive forces between layers, that is, between the cycloolefine-based stretched film and the liquid crystal alignment layer, and between the liquid crystal alignment layer and the liquid crystal film, were evaluated according to the ASTM standard (a cross-cut testing method), and phase difference was measured using an Axoscan (manufactured by Axomatrix) so as to evaluate optical properties of the liquid crystal film formed on formed on the liquid crystal alignment layer.

TABLE 1

| Item | | | Weight (g) | Weight ratio (%) |
|---|---|---|---|---|
| Alignment layer composition solution | Solvent | Cyclopentanone | 980 | 95.6 |
| | Alignment layer composition | 5-norbornene-2-methyl-(4-methoxy cinnamate) | 20 | 1.95 |
| | | Pentaerythritol triacrylate | 20 | 1.95 |
| | | Irgacure 907 | 5 | 0.5 |

Example 2

A liquid crystal film was produced in the same manners as in Example 1, except using a polymeric liquid crystal compound (Merck) having homeotropic alignment, which consists of cianobiphenyl-based acrylate, cianophenyl cyclohexane-based acrylate, and cianophenyl ester-based acrylate, instead of the polymeric liquid crystal compound having a splay alignment, which consists of cianobiphenyl-based acrylate, cianophenyl cyclohexane-based acrylate, and cianophenyl ester-based acrylate.

Example 3

A liquid crystal film was produced in the same manners as in Example 1, except using a polymeric liquid crystal compound (Merck) having cholesteric alignment, which consists of cianobiphenyl-based acrylate, cianophenyl cyclohexane-based acrylate, cianophenyl ester-based acrylate, benzoic acid phenyl ester-based acrylate, and phenyl pyrimidine-based acrylate, instead of the polymeric liquid crystal compound having a splay alignment, which consists of cianobiphenyl-based acrylate, cianophenyl cyclohexane-based acrylate and cianophenyl ester-based acrylate.

Example 4

A liquid crystal film was produced in the same manners as in Example 1, except using 5-norbornene-2-methyl-(4-fluoro cinnamate) instead of 5-norbornene-2-methyl-(4-methoxy cinnamate) as a photoreactive polymer.

Example 5

A liquid crystal film was produced in the same manners as in Example 1, except using 5-norbornene-2-methyl-(4-allyloxy cinnamate) (compound represented the Formula 6) instead of 5-norbornene-2-methyl-(4-methoxy cinnamate) as a photoreactive polymer.

Example 6

A liquid crystal film was produced in the same manners as in Example 1, except using 5-norbornene-2-methyl-cinnamate (compound represented the Formula 5) instead of 5-norbornene-2-methyl-(4-methoxy cinnamate) as a photoreactive polymer.

Example 7

As listed in the following Table 2, 5-norbornene-2-methyl-(4-methoxy cinnamate) as a photoreactive polymer, dipentaerythritol hexaacrylate as a multifunctional monomer, and Irgacure 907 (Swiss, Ciba-Geigy) as a photoinitiator were dissolved in toluene at a concentration of 2% by weight, 2% by weight, and 0.5% by weight, respectively. The composition solution for liquid crystal alignment layer that were prepared according to the above composition was applied on an acetylcellulose substrate with a thickness of 80 micron to a dry thickness of 1,000 Å, and dried with hot wind for 2 minutes in a 70° C. dry oven to form a liquid crystal alignment layer.

The liquid crystal alignment layer was cured once by polarized UV perpendicular to substrate direction at a rate of 3 m/min using an 80 w/cm high-pressure mercury lamp and a wire-grid polarizing plate (Moxtek) to provide alignment property.

The mixed solid of 95% by weight of the polymeric liquid crystal compound (Merck) having a planar alignment, which consists of cianobiphenyl-based acrylate, cianophenyl cyclohexane-based acrylate, and cianophenyl ester-based acrylate, and 5% by weight of Irgacure 907 (Swiss, Ciba-Geigy) as a photoinitiator was dissolved in toluene at a solid concentration of 25 parts by weight, based on solution 100 parts by weight of the total solution to prepare a polymeric liquid crystal compound solution. The polymeric liquid crystal compound solution was applied on the liquid crystal alignment layer to a dry thickness of 1 micron, and dried with hot wind for 2 minutes in a 60° C. dry oven, and cured by non-polarized UV irradiation using an 80 w/cm high-pressure mercury lamp to produce a liquid crystal film.

As a result, it is possible to finally prepare an optical film laminate including an acetylcellulose substrate, a liquid crystal alignment layer formed on the substrate, and a liquid crystal film formed on the liquid crystal alignment layer, all of which are laminated in sequence.

Adhesive forces between layers, that is, between the acetylcellulose substrate and the liquid crystal alignment layer, and between the liquid crystal alignment layer and the liquid crystal film, were evaluated according to the ASTM standard (a cross-cut testing method), and phase difference was measured using an Axoscan (manufactured by Axomatrix) so as to evaluate optical properties of the liquid crystal film formed on formed on the liquid crystal alignment layer.

TABLE 2

| | | Item | Weight (g) | Weight ratio (%) |
|---|---|---|---|---|
| Alignment layer composition solution | Solvent | Toluene | 980 | 95.6 |
| | Alignment layer composition | 5-norbornene-2-methyl-(4-methoxy cinnamate) | 20 | 1.95 |
| | | Dipentaerythritol hexaacrylate | 20 | 1.95 |
| | | Irgacure 907 | 5 | 0.5 |

Example 8

A liquid crystal film was produced in the same manners as in Example 7, except using tris[2-(acryloyloxy)ethyl]isocyanurate instead of dipentaerythritol hexaacrylate as a multi-functional monomer as shown in the following Table 3.

TABLE 3

| | | Item | Weight (g) | Weight ratio (%) |
|---|---|---|---|---|
| Alignment layer composition solution | Solvent | Toluene | 980 | 95.6 |
| | Alignment layer composition | 5-norbornene-2-methyl-(4-methoxy cinnamate) | 20 | 1.95 |
| | | Tris [2-(acryloyloxy)ethyl] isocyanurate | 20 | 1.95 |
| | | Irgacure 907 | 5 | 0.5 |

Example 9

A liquid crystal film was produced in the same manners as in Example 7, except using a polymeric liquid crystal compound (Merck) having splay alignment, which consists of cianobiphenyl-based acrylate, cianophenyl cyclohexane-based acrylate, and cianophenyl ester-based acrylate, instead of the polymeric liquid crystal compound having a planar alignment, which consists of cianobiphenyl-based acrylate, cianophenyl cyclohexane-based acrylate, and cianophenyl ester-based acrylate.

Example 10

A liquid crystal film was produced in the same manners as in Example 7, except using a polymeric liquid crystal compound (Merck) having cholesteric alignment, which consists of cianobiphenyl-based acrylate, cianophenyl cyclohexane-based acrylate, cianophenyl ester-based acrylate, benzoic acid phenyl ester-based acrylate, and phenyl pyrimidine-based acrylate, instead of the polymeric liquid crystal compound having a planar alignment, which consists of cianobiphenyl-based acrylate, cianophenyl cyclohexane-based acrylate, and cianophenyl ester-based acrylate.

Example 11

A liquid crystal film was produced in the same manners as in Example 7, except that the polarized UV light is irradiated in 15 degrees inclination to the substrate direction upon producing a liquid crystal alignment layer.

Example 12

A liquid crystal film was produced in the same manners as in Example 7, except that the polarized UV light is irradiated in 75 degrees inclination to the substrate direction upon producing a liquid crystal alignment layer.

Example 13

A liquid crystal film was produced in the same manners as in Example 7, except using 5-norbornene-2-methyl-(4-fluoro cinnamate) instead of 5-norbornene-2-methyl-(4-methoxy cinnamate) as a photoreactive polymer.

Example 14

A liquid crystal film was produced in the same manners as in Example 7, except using 5-norbornene-2-methyl-(4-allyloxy cinnamate) (compound represented the Formula 6) instead of 5-norbornene-2-methyl-(4-methoxy cinnamate) as a photoreactive polymer.

Example 15

A liquid crystal film was produced in the same manners as in Example 7, except using 5-norbornene-2-methyl-cinnamate (compound represented the Formula 5) instead of 5-norbornene-2-methyl-(4-methoxy cinnamate) as a photoreactive polymer.

Example 16

The resin composition in which poly(N-cyclohexylmaleimide-co-methylmethacrylate) and the phenoxy-based resin were uniformly mixed with each other at the weight ratio of 85:15 was provided to the extruder of 16 ϕ in which nitrogen was substituted from the raw hopper to the extruder and moltened at 250° C. to produce the raw material pellet.

As the phenoxy-based resin, PKFE (Mw=60,000, Mn=16,000, and Tg=98° C.) that was manufactured by InChemRez® was used, and the poly(N-cyclohexylmaleimide-co-methylmethacrylate) resin was subjected to the NMR analysis, as a result, the content of N-cyclohexylmaleimide was 6.5% by weight.

The obtained raw material pellet was vacuum dried, moltened at 260° C. by using the extruder, passed through the coat hanger type T-die, the chrome coating casting roll and the dry roll to produce the film having the thickness of 40 μm.

As listed in the following Table 4, 5-norbornene-2-methyl-(4-methoxy cinnamate) as a photoreactive polymer, dipentaerythritol hexaacrylate as a multifunctional monomer, and Irgacure OXE02 (Swiss, Ciba-Geigy) as a photoinitiator were dissolved in cyclopentanone at a concentration of 2% by weight, 2% by weight, and 0.5% by weight, respectively. The composition solution for liquid crystal alignment layer that were prepared according to the above composition was applied on a cycloolefine-based film (Japan, SEKISUI, KANEKA) to a dry thickness of 1,000 Å, and dried with hot wind for 2 minutes in a 70° C. dry oven to form a liquid crystal alignment layer.

The liquid crystal alignment layer was cured once by polarized UV perpendicular to substrate direction at a rate of 3 m/min using an 80 w/cm high-pressure mercury lamp and a wire-grid polarizing plate (Moxtek) to provide alignment property.

The mixed solid of 95% by weight of the polymeric liquid crystal compound (Merck) having a planar alignment, which consists of cianobiphenyl-based acrylate, cianophenyl cyclohexane-based acrylate, and cianophenyl ester-based acrylate, and 5% by weight of Irgacure 907 (Swiss, Ciba-Geigy) as a photoinitiator was dissolved in toluene at a solid concentration of 25 parts by weight, based on solution 100 parts by weight of the total solution to prepare a polymeric liquid crystal compound solution. The polymeric liquid crystal compound solution was applied on the liquid crystal alignment layer to a dry thickness of 1 micron, and dried with hot wind for 2 minutes in a 60° C. dry oven, and cured by non-polarized UV irradiation using an 80 w/cm high-pressure mercury lamp to produce a liquid crystal film.

As a result, it is possible to finally prepare an optical film laminate including an acrylic film, a liquid crystal alignment layer formed on the acrylic film, and a liquid crystal film formed on the liquid crystal alignment layer, all of which are laminated in sequence.

TABLE 4

| | Item | | Weight (g) | Weight ratio (%) |
|---|---|---|---|---|
| Alignment layer composition solution | Solvent | Cyclopentanone | 980 | 95.6 |
| | Alignment layer composition | 5-norbornene-2-methyl-(4-methoxy cinnamate) | 20 | 1.95 |
| | | Dipentaerythritol Hexaacrylate | 20 | 1.95 |
| | | Irgacure OXE02 | 5 | 0.5 |

Example 17

A liquid crystal film was produced in the same manners as in Example 16, except using a polymeric liquid crystal compound (Merck) having splay alignment, which consists of cianobiphenyl-based acrylate, cianophenyl cyclohexane-based acrylate, and cianophenyl ester-based acrylate, instead of the polymeric liquid crystal compound having a planar alignment, which consists of cianobiphenyl-based acrylate, cianophenyl cyclohexane-based acrylate, and cianophenyl ester-based acrylate.

Example 18

A liquid crystal film was produced in the same manners as in Example 1, except using a polymeric liquid crystal compound (Merck) having cholesteric alignment, which consists of cianobiphenyl-based acrylate, cianophenyl cyclohexane-based acrylate, cianophenyl ester-based acrylate, benzoic acid phenyl ester-based acrylate, and phenyl pyrimidine-based acrylate, instead of the polymeric liquid crystal compound having a planar alignment, which consists of cianobiphenyl-based acrylate, cianophenyl cyclohexane-based acrylate and cianophenyl ester-based acrylate.

Comparative Example 1

A liquid crystal film was produced in the same manners as in Example 1, except using a composition for liquid crystal alignment layer which consists of only 5-norbornene-2-methyl-(4-methoxy cinnamate) without a multifunctional monomer and a photoinitiator, as shown in the following Table 5.

TABLE 5

| | Item | | Weight (g) | Weight ratio (%) |
|---|---|---|---|---|
| Alignment layer composition solution | Solvent | Cyclopentanone | 980 | 98 |
| | Alignment layer composition | 5-norbornene-2-methyl-(4-methoxy cinnamate) | 20 | 2 |
| | | Pentaerythritol triacrylate | 0 | 0 |
| | | Irgacure 907 | 0 | 0 |

Comparative Example 2

A liquid crystal film was produced in the same manners as in Example 1, except using a composition for liquid crystal alignment layer which consists of 5-norbornene-2-methoxy-hexyl acrylate instead of 5-norbornene-2-methyl-(4-methoxy cinnamate), as shown in the following Table 6.

TABLE 6

| | Item | | Weight (g) | Weight ratio (%) |
|---|---|---|---|---|
| Alignment layer composition solution | Solvent | Cyclopentanone | 980 | 95.6 |
| | Alignment layer composition | 5-norbornene-2-methoxy-hexyl acrylate | 20 | 1.95 |
| | | Pentaerythritol triacrylate | 20 | 1.95 |
| | | Irgacure 907 | 5 | 0.5 |

Comparative Example 3

A liquid crystal film was produced in the same manners as in Example 7, except using a composition for liquid crystal alignment layer which consists of only 5-norbornene-2-methyl-(4-methoxy cinnamate) without a multifunctional monomer and a photoinitiator, as shown in the following Table 7.

TABLE 7

| Item | | | Weight (g) | Weight ratio (%) |
|---|---|---|---|---|
| Alignment layer composition solution | Solvent | Toluene | 980 | 98 |
| | Alignment layer composition | 5-norbornene-2-methyl-(4-methoxy cinnamate) | 20 | 2 |
| | | Dipentaerythritol hexaacrylate | 0 | 0 |
| | | Irgacure 907 | 0 | 0 |

Comparative Example 4

A liquid crystal film was produced in the same manners as in Example 7, except using a composition for liquid crystal alignment layer which consists of 5-norbornene-2-methoxyhexyl acrylate instead of 5-norbornene-2-methyl-(4-methoxy cinnamate), as shown in the following Table 8.

TABLE 8

| Item | | | Weight (g) | Weight ratio (%) |
|---|---|---|---|---|
| Alignment layer composition solution | Solvent | Toluene | 980 | 95.6 |
| | Alignment layer composition | 5-norbornene-2-methoxy-hexyl acrylate | 20 | 1.95 |
| | | Dipentaerythritol hexaacrylate | 20 | 1.95 |
| | | Irgacure 907 | 5 | 0.5 |

<Phase Difference of Splay Alignment (Cycloolefine-Based Film)>

Figure 1:
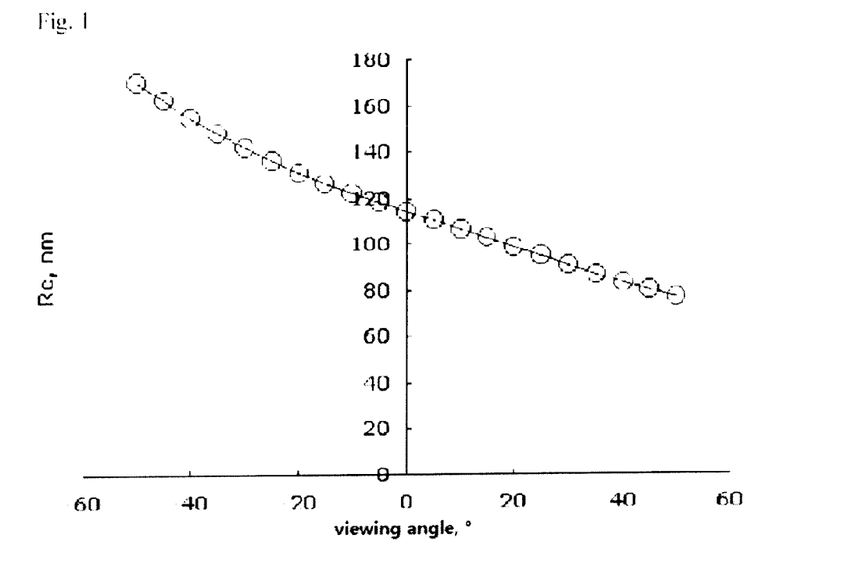
FIG. 1 shows phase difference distribution determined according to the viewing angles of the splay alignment liquid crystal film formed on the alignment layer prepared according to Example 1 of the present invention.

FIG. 1 shows phase difference distribution determined according to the viewing angles of the splay alignment liquid crystal film formed on the alignment layer prepared according to Example 1. As shown in FIG. 1, it was revealed that the phase difference of the splay alignment liquid crystal film is distributed uniformly according to the viewing angles.

<Phase Difference of Homeotropic Alignment (Cycloolefin-Based Film)>

Figure 2:
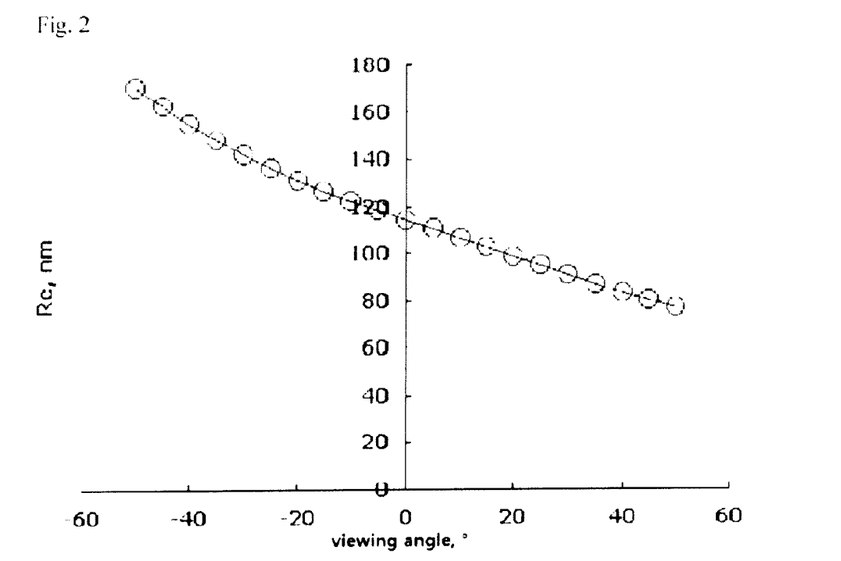
FIG. 2 shows phase difference distribution determined according to the viewing angles of the homeotropic alignment liquid crystal film formed on the alignment layer prepared according to Example 2 of the present invention.

FIG. 2 shows phase difference distribution determined according to the viewing angles of the homeotropic alignment liquid crystal film formed on the alignment layer prepared according to Example 2. As shown in FIG. 2, it was revealed that the phase difference of the homeotropic alignment liquid crystal film is distributed uniformly according to the viewing angles.

<Transmittance of Cholesteric Alignment (Cycloolefin-Based Film)>

Figure 3:
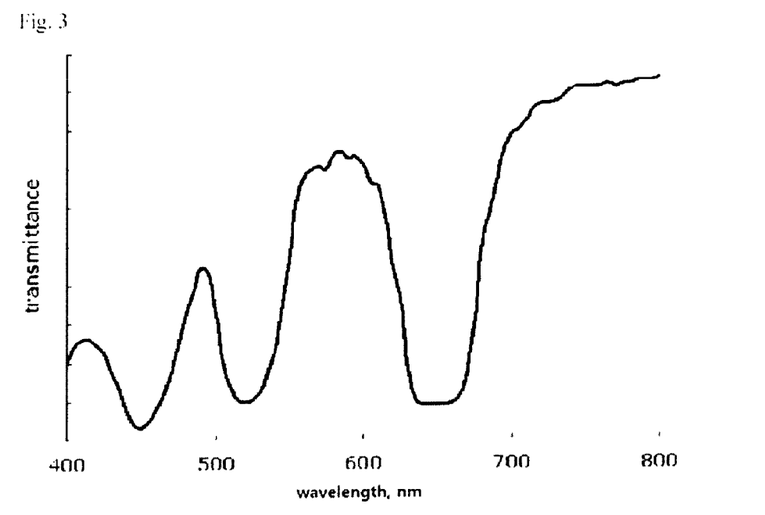
FIG. 3 shows transmittance of the cholesteric alignment liquid crystal film formed on the alignment layer prepared according to Example 3 of the present invention.

FIG. 3 shows transmittance of cholesteric alignment liquid crystal film formed on the alignment layer prepared according to Example 3. As shown in FIG. 3, it was revealed that cholesteric liquid crystals were aligned according to each wavelength.

<Phase Difference of Planar Alignment (Acetylcellulose Film)>

Figure 4:
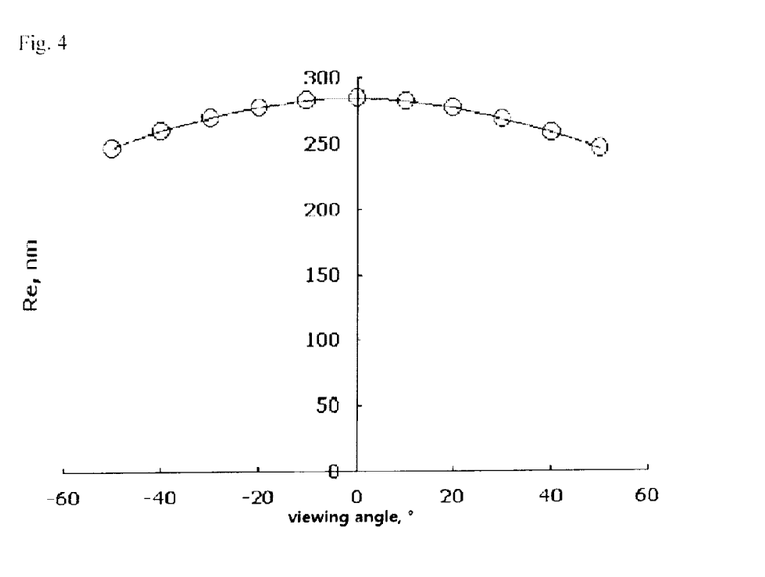
FIG. 4 shows phase difference distribution determined according to the viewing angles of the planar alignment liquid crystal film formed on the alignment layer prepared according to Example 7 of the present invention.

FIG. 4 shows phase difference distribution determined according to the viewing angles of the planar alignment liquid crystal film formed on the alignment layer prepared according to Example 7. As shown in FIG. 4, it was revealed that the phase difference of the planar alignment liquid crystal film is distributed uniformly according to the viewing angles.

<Phase Difference of Splay Alignment (Acetylcellulose Film)>

Figure 5:
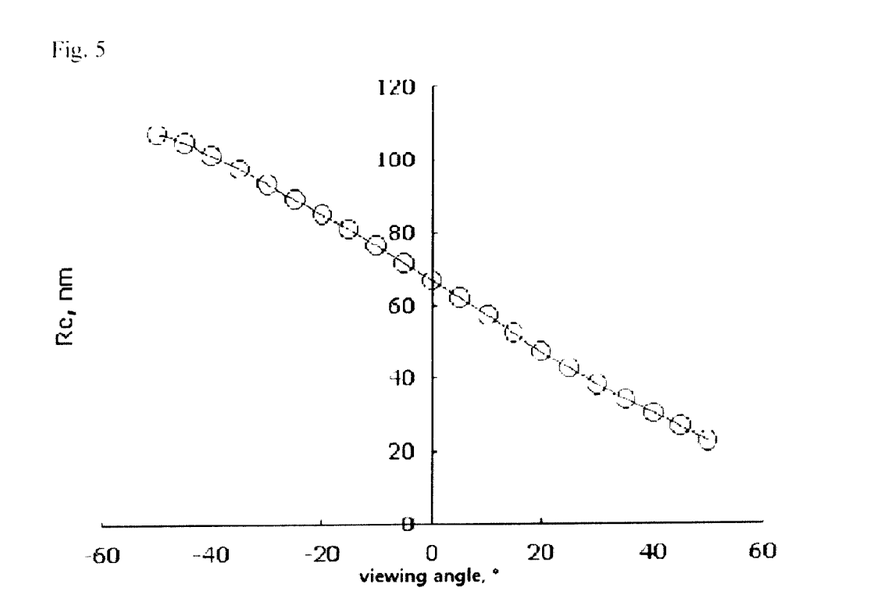
FIG. 5 shows phase difference distribution determined according to the viewing angles of the splay alignment liquid crystal film formed on the alignment layer prepared according to Example 9 of the present invention.

FIG. 5 shows phase difference distribution determined according to the viewing angles of the splay alignment liquid crystal film formed on the alignment layer prepared according to Example 9. As shown in FIG. 5, it was revealed that the phase difference of the splay alignment liquid crystal film is distributed uniformly according to the viewing angles.

<Transmittance of Cholesteric Alignment (Acetylcellulose Film)>

Figure 6:
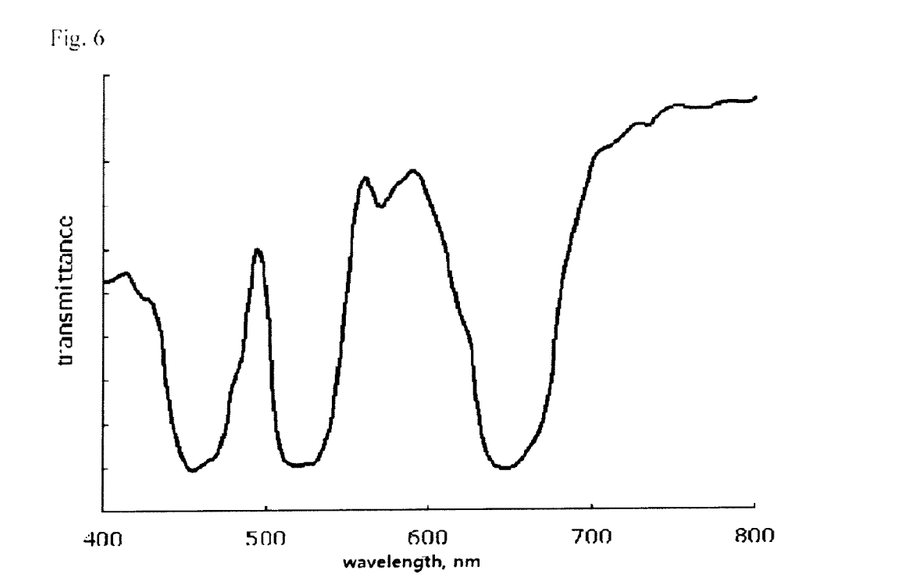
FIG. 6 shows transmittance of the cholesteric alignment liquid crystal film formed on the alignment layer prepared according to Example 10 of the present invention.

FIG. 6 shows transmittance of cholesteric alignment liquid crystal film formed on the alignment layer prepared according to Example 10. As shown in FIG. 6, it was revealed that cholesteric liquid crystals were aligned according to each wavelength.

<Alignment Properties and Adhesiveness>

The liquid crystal films prepared in Examples 1 to 15 and Comparative examples 1 to 4 were evaluated for alignment properties, adhesiveness between the substrate and the alignment layer, and adhesiveness between the alignment layer and the liquid crystal, and the results were listed in the following Table 9. The evaluation of the alignment properties was dividedly carried out: when there is no alignment at all (X); when there is alignment with a slight deviation (Δ); and when there is alignment without deviation (○). The adhesiveness was determined by cross-cutting a surface of the liquid crystal film with a line style such as checkers at a distance of 1 mm according to the ASTM standard, and determining whether the liquid crystal film remains attached to the substrate when a cellophane tape is attached to the liquid crystal film and then detached from the liquid crystal film. Here, Level (○) represents that the liquid crystal film is intactly attached to the substrate, Level (X) represents that the liquid crystal film is partially or completely detached from the checkers of the substrate.

TABLE 9

| | | | Adhesiveness | |
|---|---|---|---|---|
| Section | | Alignment property | Substrate/Alignment layer | Alignment layer/Liquid crystal film |
| Example | Example 1 | ○ | ○ | ○ |
| | Example 2 | ○ | ○ | ○ |
| | Example 3 | ○ | ○ | ○ |
| | Example 4 | ○ | ○ | ○ |
| | Example 5 | Δ | ○ | ○ |
| | Example 6 | Δ | ○ | ○ |
| | Example 7 | ○ | ○ | ○ |
| | Example 8 | ○ | ○ | ○ |
| | Example 9 | ○ | ○ | ○ |
| | Example 10 | ○ | ○ | ○ |
| | Example 11 | ○ | ○ | ○ |
| | Example 12 | ○ | ○ | ○ |
| | Example 13 | ○ | ○ | ○ |
| | Example 14 | Δ | ○ | ○ |
| | Example 15 | Δ | ○ | ○ |
| | Example 16 | ○ | ○ | ○ |
| | Example 17 | ○ | ○ | ○ |
| | Example 18 | ○ | ○ | ○ |
| Comparative Example | Comparative Example 1 | ○ | X | ○ |
| | Comparative Example 2 | X | X | X |
| | Comparative Example 3 | ○ | X | ○ |

TABLE 9-continued

| | | Adhesiveness | |
|---|---|---|---|
| Section | Alignment property | Substrate/ Alignment layer | Alignment layer/Liquid crystal film |
| Comparative Example 4 | X | X | X |

<Thermal Stability of Alignment Layer>

The photoalignment layers prepared in Examples 1 to 18, and Comparative Examples 1 to 4 were left in a 100° C. dry oven for 48 hrs or longer. The polymeric liquid crystal compound was applied on the alignment layer, and alignment property and adhesiveness were examined to confirm the thermal stability of the alignment layers. The results are shown in the following Table 10. The evaluation of the alignment properties was dividedly carried out: when there is no alignment at all (X); when there is alignment with a slight deviation (Δ); and when there is alignment without deviation (◯). The adhesiveness was determined by cross-cutting a surface of the liquid crystal film with a line style such as checkers at a distance of 1 mm according to the ASTM standard, and determining whether the liquid crystal film remains attached to the substrate when a cellophane tape is attached to the liquid crystal film and then detached from the liquid crystal film. Here, Level (◯) represents that the liquid crystal film is intactly attached to the substrate, Level (X) represents that the liquid crystal film is partially or completely detached from the checkers of the substrate.

TABLE 10

| | | | Adhesiveness | |
|---|---|---|---|---|
| Section | | Alignment property | Substrate/ Alignment layer | Alignment layer/Liquid crystal film |
| Example | Example 1 | ◯ | ◯ | ◯ |
| | Example 2 | ◯ | ◯ | ◯ |
| | Example 3 | ◯ | ◯ | ◯ |
| | Example 4 | ◯ | ◯ | ◯ |
| | Example 5 | Δ | ◯ | ◯ |
| | Example 6 | Δ | ◯ | ◯ |
| | Example 7 | ◯ | ◯ | ◯ |
| | Example 8 | ◯ | ◯ | ◯ |
| | Example 9 | ◯ | ◯ | ◯ |
| | Example 10 | ◯ | ◯ | ◯ |
| | Example 11 | ◯ | ◯ | ◯ |
| | Example 12 | ◯ | ◯ | ◯ |
| | Example 13 | ◯ | ◯ | ◯ |
| | Example 14 | Δ | ◯ | ◯ |
| | Example 15 | Δ | ◯ | ◯ |
| | Example 16 | ◯ | ◯ | ◯ |
| | Example 17 | ◯ | ◯ | ◯ |
| | Example 18 | ◯ | ◯ | ◯ |
| Comparative Example | Comparative Example 1 | X | X | ◯ |
| | Comparative Example 2 | X | X | X |
| | Comparative Example 3 | X | X | ◯ |
| | Comparative Example 4 | X | X | X |

Taken together, when a liquid crystal alignment layer is prepared using the composition for liquid crystal alignment layer according to the present invention, thermal stability and surface hardness of the liquid crystal alignment layer were improved, and adhesive strength between the substrate and the liquid crystal alignment layer and between the liquid crystal alignment layer and the liquid crystal film was improved, so that durability of the optical film was improved. Accordingly, under the conditions of high temperature and high humidity, the liquid crystal film was not shrunken, or not separated from the liquid crystal alignment layer.

The invention claimed is:

1. A composition for liquid crystal alignment layer, comprising
1) a photoreactive polymer comprising a unit represented by the following Formula 1,
2) a multifunctional monomer crosslinkable with the 1) photoreactive polymer,
3) a photoinitiator, and
4) an organic solvent:

[Formula 1]

2. The composition for liquid crystal alignment layer according to claim 1, wherein the 1) photoreactive polymer has a number average molecular weight of 10,000~500,000.

3. The composition for liquid crystal alignment layer according to claim 1, wherein the content of the 1) photoreactive polymer is 0.1 to 20% by weight, based on the total composition for liquid crystal alignment layer.

4. The composition for liquid crystal alignment layer according to claim 1, wherein the 2) multifunctional monomer comprises a functional group that generates a radical reaction selected from the group consisting of the following Structural Formulae:

5. The composition for liquid crystal alignment layer according to claim 1, wherein the 2) multifunctional monomer comprises one or more selected from the group consisting of trimethylolpropane triacrylate, pentaerythritol tri (meth)/tetraacrylate, dipentaerythritol hexa/pentaacrylate, triglycerol di(meth)acrylate, tripropylene glycol di(meth) acrylate, tetraethylene glycol di(meth)acrylate, pentaerythritol di(meth)acrylate, 1,6-hexandiol di(meth)acrylate, glycerol di(meth)acrylate, 2-hydroxyethyl (meth)acrylate, 2-hydroxypropyl (meth)acrylate, methoxyethyl (meth)acrylate, N,N-dimethylaminoethyl (methyl)acrylate, butoxytriethylene glycol (meth)acrylate, 2-carboxyethyl acrylate, hydroxypropyl acrylate, mono-2-(acryloyloxy)ethyl succinate, vinyl acrylate, 3-(acryloyloxy)-2-hydroxypropyl (meth) acrylate, glycerol 1,3-diglycerolate diacrylate, tri(propylene glycol) glycerolate diacrylate, allyl (meth)acrylate, diacetone acrylamide, (meth)acrylamide, methyl 2-acetamidoacrylate, N-[tris(hydroxymethyl)methyl]acrylamide, N,N'-(1,2-dihydroxyethylene)bisacrylamide, N,N'-methylenebis(acrylamide), 1,3,5-triacryloylhexahydro-1,3,5-triazine, 2,4,6-triallyloxy-1,3,5-triazine, tris (2,3-epoxypropyl)isocyanurate, tris [2-(acryloyloxy)ethyl]isocyanurate, tetracyanoethylene oxide, triallyl 1,3,5-benzenetricarboxylate, diacetone acrylamide, N,N'-(1,2-dihydroxyethylene)bisacrylamide, poly (melamine-co-formaldehyde), 2-carboxyethyl acrylate, hydroxypropyl acrylate, mono-2-(acryloyloxy)ethyl succinate, vinyl acrylate, 3-(acryloyloxy)-2-hydroxypropyl (meth) acrylate, 2-(2-oxo-imidazolydinyl)ethyl (meth)acrylate, caprolactone 2-((meth)acryloyloxy)ethyl ester, mono-2-((meth)acryloyloxy)ethyl malate, 1,2,3-triazol-4,5-dicarboxylic acid, 3-allyloxy-1,2-propandiol, bis[4-(glycidyloxy) phenyl]methane, and 2-vinyl-1,3,-dioxalene.

6. The composition for liquid crystal alignment layer according to claim 1, wherein the content of the 2) multifunctional monomer is 0.1 to 20% by weight, based on the total composition for liquid crystal alignment layer.

7. The composition for liquid crystal alignment layer according to claim 1, wherein the content of the 3) photoinitiator is 0.01 to 5% by weight, based on the total composition for liquid crystal alignment layer.

8. The composition for liquid crystal alignment layer according to claim 1, wherein the 4) organic solvent includes one or more selected from the group consisting of ether-based, aromatic-based, halogen-based, olefin-based, and ketone-based solvents.

* * * * *